United States Patent
Rivas et al.

(10) Patent No.: US 7,531,911 B2
(45) Date of Patent: May 12, 2009

(54) REACTIVE POWER CONTROL FOR OPERATING A WIND FARM

(75) Inventors: Gregorio Rivas, Pamplona (ES); Iker Garmendia, Ondarroa (ES); Josu Elorriaga, Plencia (ES); Jesus Mayor, Pamplona (ES); Javier Perez Barbachano, Pamplona (ES); David Sole, Pamplona (ES); Jorge Acedo, Pamplona (ES)

(73) Assignee: Ingeteam Energy, S.A., Pamplona (ES)

( * ) Notice: Subject to any disclaimer, the term of this patent is extended or adjusted under 35 U.S.C. 154(b) by 220 days.

(21) Appl. No.: 11/615,241

(22) Filed: Dec. 22, 2006

(65) Prior Publication Data

US 2008/0150283 A1 Jun. 26, 2008

(51) Int. Cl.
F03D 9/00 (2006.01)
H02P 9/04 (2006.01)
(52) U.S. Cl. .......................... 290/44; 290/55
(58) Field of Classification Search ............... 290/44, 290/55
See application file for complete search history.

(56) References Cited

U.S. PATENT DOCUMENTS

| | | | | |
|---|---|---|---|---|
| 4,251,735 A * | 2/1981 | Coleman | ................ | 307/46 |
| 4,251,736 A * | 2/1981 | Coleman | ................ | 307/46 |
| 6,492,801 B1 | 12/2002 | Sims et al. | ................ | 324/142 |
| 6,591,225 B1 * | 7/2003 | Adelman et al. | ................ | 702/182 |
| 6,680,602 B2 * | 1/2004 | Iyoda et al. | ................ | 323/207 |
| 6,853,094 B2 * | 2/2005 | Feddersen et al. | ................ | 290/44 |
| 6,856,040 B2 * | 2/2005 | Feddersen et al. | ................ | 290/44 |
| 6,856,041 B2 * | 2/2005 | Siebenthaler et al. | ................ | 290/44 |
| 6,924,565 B2 | 8/2005 | Wilkins et al. | ................ | 290/44 |
| 6,924,627 B1 | 8/2005 | Wobben | ................ | 322/20 |
| 6,933,625 B2 * | 8/2005 | Feddersen et al. | ................ | 290/44 |
| 6,965,174 B2 | 11/2005 | Wobben | ................ | 290/44 |
| 7,015,595 B2 * | 3/2006 | Feddersen et al. | ................ | 290/44 |
| 7,102,325 B2 * | 9/2006 | Vertanen | ................ | 318/807 |
| 7,119,452 B2 * | 10/2006 | Larsen | ................ | 290/55 |
| 7,166,928 B2 * | 1/2007 | Larsen | ................ | 290/55 |
| 2003/0151259 A1 * | 8/2003 | Feddersen et al. | ................ | 290/44 |
| 2004/0217594 A1 * | 11/2004 | Feddersen et al. | ................ | 290/44 |
| 2004/0217595 A1 * | 11/2004 | Feddersen et al. | ................ | 290/44 |
| 2004/0217596 A1 * | 11/2004 | Feddersen et al. | ................ | 290/44 |
| 2004/0222642 A1 * | 11/2004 | Siebenthaler et al. | ................ | 290/44 |
| 2004/0225486 A1 * | 11/2004 | Mullis et al. | ................ | 703/18 |
| 2005/0015283 A1 * | 1/2005 | Iino et al. | ................ | 705/4 |

(Continued)

FOREIGN PATENT DOCUMENTS

EP 1 508 951 A 2/2005

(Continued)

OTHER PUBLICATIONS

International Search Report, dated Jun. 13, 2008, for PCT/IB2007/002983.

(Continued)

*Primary Examiner*—Quyen Leung
*Assistant Examiner*—Pedro J Cuevas
(74) *Attorney, Agent, or Firm*—Sughrue Mion, PLLC (57) ABSTRACT

A system and method of reactive power regulation in a wind farm having a plurality of wind turbines that provides optimum control of the reactive power compensation in the wind farm and is able to keep a reactive power reserve in order to support eventual grid contingencies.

8 Claims, 6 Drawing Sheets

U.S. PATENT DOCUMENTS

| | | | |
|---|---|---|---|
| 2005/0046196 A1* | 3/2005 | Larsen | 290/44 |
| 2005/0253396 A1* | 11/2005 | Mikhail et al. | 290/44 |
| 2006/0006835 A1* | 1/2006 | Vertanen | 318/807 |
| 2006/0012181 A1* | 1/2006 | Larsen | 290/44 |
| 2006/0132993 A1 | 6/2006 | Delmerico et al. | 361/20 |
| 2006/0178762 A1* | 8/2006 | Wroblewski et al. | 700/30 |
| 2006/0186670 A1* | 8/2006 | Hudson | 290/44 |
| 2006/0214428 A1* | 9/2006 | Altemark et al. | 290/44 |
| 2006/0255594 A1* | 11/2006 | Larsen | 290/44 |
| 2007/0085343 A1* | 4/2007 | Fortmann | 290/44 |
| 2007/0108771 A1* | 5/2007 | Jones et al. | 290/44 |
| 2007/0135970 A1* | 6/2007 | Zhou et al. | 700/286 |
| 2007/0142975 A1* | 6/2007 | Piche | 700/286 |
| 2007/0228838 A1* | 10/2007 | Delmerico et al. | 307/84 |
| 2008/0143304 A1* | 6/2008 | Bose et al. | 323/205 |
| 2008/0150285 A1* | 6/2008 | Corcelles Pereira et al. | 290/44 |
| 2008/0157530 A1* | 7/2008 | Corcelles Pereira et al. | 290/44 |
| 2008/0157533 A1* | 7/2008 | Flottemesch et al. | 290/55 |
| 2008/0185845 A1* | 8/2008 | Ichinose et al. | 290/44 |

FOREIGN PATENT DOCUMENTS

| | | |
|---|---|---|
| EP | 1 548 278 A2 | 6/2005 |
| EP | 1 643 609 A | 4/2006 |
| EP | 1 643 609 A2 | 4/2006 |
| WO | 2005/031160 A | 4/2005 |
| WO | WO 2005/031160 A2 | 4/2005 |
| WO | WO 2005/085634 A1 | 9/2005 |
| WO | WO 2006/037576 A1 | 4/2006 |
| WO | WO 2006/120033 A2 | 11/2006 |

OTHER PUBLICATIONS

Miller N W et al: "Dynamic modeling of GE 1.5 adn 3.6 MW wind turbine generators for stability simulations" 2003 IEEE Power Engineering Society General Meeting. Conference Proceedings. Toronto, Ontario, Canada, Jul. 13-17, 2003, IEEE Power Engineering Society, New York, NY: IEEE, US, vol. vol. 4 of 4, Jul. 13, 2003, pp. 1977-1983, XP010683633.

Jose Luis Rodriguez-Amenedorodriguez-Amenedo et al: "Automatic Generation Control of a Wind Farm With Variable Speed Wind Turbines" IEEE Transactions on Energy Conversion, IEEE Service Center, Piscataway, NJ, US, vol. 17, No. 2, Jun. 2002, XP011072090.

Celli, G. et al., "Optimal Participation of a Microgrid the Energy Market with an Intelligent EMS", Power Engineering Conference, Singapore, Nov. 29, 2005, XP010914083.

International Search Report and Written Opinion, dated Nov. 27, 2008, for PCT/IB2007/002983.

Zbigniew Lubosny et al: "Supervisory Control of a Wind Farm" IEEE Transactions on Power Systems, IEEE Service Center, Piscataway, NJ, US, vol. 22, No. 3, Aug. 1, 2007, pp. 985-994, XP011189262.

Hansen et al: "Centralised power control of wind farm with doubly fed induction generators" Renewable Energy, Pergamon Press, Oxford, GB, vol. 31, No. 7, Jun. 1, 2006, pp. 935-951, XP005257065.

Vincent Courtecuisse et al: "Performance comparison of different wind generator based hybrid systems" Power Electronics and Motion Control Conference, 2008. EPE-PEMC 2008. 13th, IEEE, Piscataway, NJ, USA, Sep. 1, 2008, pp. 2184-2191, XP031329147.

* cited by examiner

REACTIVE POWER CONTROL FOR OPERATING A WIND FARM

FIELD OF THE INVENTION

Methods and apparatuses consistent with the present invention are related to the field of wind power generation, more particularly to the reactive power control for operating a wind farm having multiple wind turbines.

BACKGROUND OF THE INVENTION

In the last few years, wind power production has become a very important energy source. Cumulative wind power worldwide is increasing remarkably and so is its share in the mix of energy production. Consequently, generation of energy from wind farms should contribute to the stability of the electrical network which is directly related to the generation or consumption of reactive power. Thus, it is necessary to perform a reactive power control in the wind farms.

However, reactive power management is often not considered as a key player for keeping the electrical network stable. Generally, reactive power production plays a secondary role in wind farm power production strategy and is usually based on the local grid voltage measurement.

Several patents have been filed concerning reactive power control in wind farms. For instance, U.S. Pat. No. 6,965,174 describes a method for operating a wind turbine in which the current phase angle is changed in response to at least one voltage measured in the grid. In addition, US 2005/0046196 also describes a method in which a reactive power setpoint, mainly generated as a consequence of a voltage measurement, is provided to the wind turbine generators. Said setpoint is achieved by controlling the wind turbine voltage.

As stated above, wind energy generation and, particularly, reactive power control should take an active part in the stability and quality of the electrical grid. Thus, reactive power compensation may have the following aims:

Fulfillment of electrical network demands.

Keeping a reactive power reserve in order to support grid contingencies.

These objectives may even lead to giving priority to reactive power over active power production depending on network conditions.

Another aspect of prior methods is that reactive power compensation is managed by the wind turbines without balancing the demanded control effort, in which the control effort is the ratio of reactive power production to the instantaneous reactive power capacity of each wind turbine. That is, reactive power compensation is carried out by all the wind turbines without an optimization strategy, probably resulting in some of them suffering from higher electrical stress and wear while others might remain below their capabilities.

SUMMARY

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

It is an aspect of exemplary embodiments of the present invention to provide a reactive power control in an integrated manner taking into account the network priorities at each moment as well as the effort demanded to the wind turbines. Thereby, this reactive power system is even able to manage a reactive power reserve in order to cope with eventual grid contingencies. In this way reactive power control is granted a key role in wind farm power production strategy.

According to one aspect of an exemplary embodiment of the present invention there is provided a reactive power control system which allows an optimum control of the reactive power compensation in a wind farm. At least the following requirements are to be met to achieve optimum control:

Co-operation with the utility manager in order to contribute to the grid stability.

Distribute the reactive power contribution among the wind turbines in such a way that the effort demanded to all of them is balanced.

Such a system includes a wind farm central control (WFCC) that can communicate with every wind turbine or group of wind turbines. This WFCC is in charge of controlling the reactive power output of the wind farm. The instantaneous reactive power output of the wind farm is continuously measured. In addition, the WFCC adjusts reactive power output by sending a unique command to every wind turbine. Each wind turbine receives this command which indicates the percentage of its instantaneous reactive power capacity and, accordingly, the wind turbine generates or consumes such an amount of reactive power. The WFCC is able to estimate the reactive power capacity of the entire wind farm.

Supporting grid stability implies being able to respond to a grid contingency. Such response must comply with the reactive power demand as well as reaction time limits. The embodiments of the present invention described here, due to the reactive power reserve, permits primary reactive power regulation because the wind farm is able to generate demanded reactive power in the short-term (e.g. 15 s).

According to this aspect of a non-limiting exemplary embodiment, the WFCC is aware of the wind farm's reserve of reactive power. This is a great advantage for the wind farm operator or utility because this reserve can be used to contribute to the stability of the electrical grid. Eventually, the availability of such a reactive power reserve can be economically recognized by means of a bonus.

Furthermore, in exemplary embodiments of the present invention a higher reserve of reactive power can be accomplished. The WFCC is able to follow demand, in one embodiment given by the utility, by enhancing the reserve of available reactive power. This functionality is achieved, if necessary, by prioritizing the reactive power reserve over the real power generation.

Another aspect of an embodiment of the present invention is that the reactive power compensation is mainly managed by the wind turbines that have higher instantaneous reactive power capacity due to the fact that the wind turbines generate or consume reactive power proportionally to their capacity. This way of proceeding avoids the reactive power compensation being carried out mainly by certain wind turbines, which would suffer higher electrical stress and premature wear.

Moreover, surveillance of the voltage limits is accomplished in the wind turbine instead of being generally done in the wind farm. Therefore, this method is very reliable because wind turbines are in charge of ensuring their own safety conditions concerning the reactive power regulation.

Another advantage is that the reactive power control is independent of wind turbine technology, model, manufacturer, etc. The WFCC operates upon the reactive power capacity percentage of every wind turbine. Thus, each wind turbine generates its own reactive power setpoint based on the command sent by the WFCC and its capacity.

A further aspect of exemplary embodiments of the present invention is that the requirements of the communication system are not so strict because WFCC sends a unique command for every wind turbine. Thus, the impact on the wind farm communication bandwidth is negligible.

BRIEF DESCRIPTION OF THE DRAWINGS

The incorporated drawings constitute part of one or more embodiments of the invention. However, they should not be taken to limit the invention to the specific embodiment. Aspects of the present invention will become more apparent by describing in detail illustrative, non-limiting embodiments thereof with reference to the accompanying drawings, in which.

DETAILED DESCRIPTION

A reactive power control system that provides an optimum control of the reactive power compensation in a wind farm is described below. Several drawings will be referenced only as illustration for the better understanding of the description. Furthermore, the same reference numbers will be used in the drawings and in the description to refer to the same or like elements.

Figure 5:
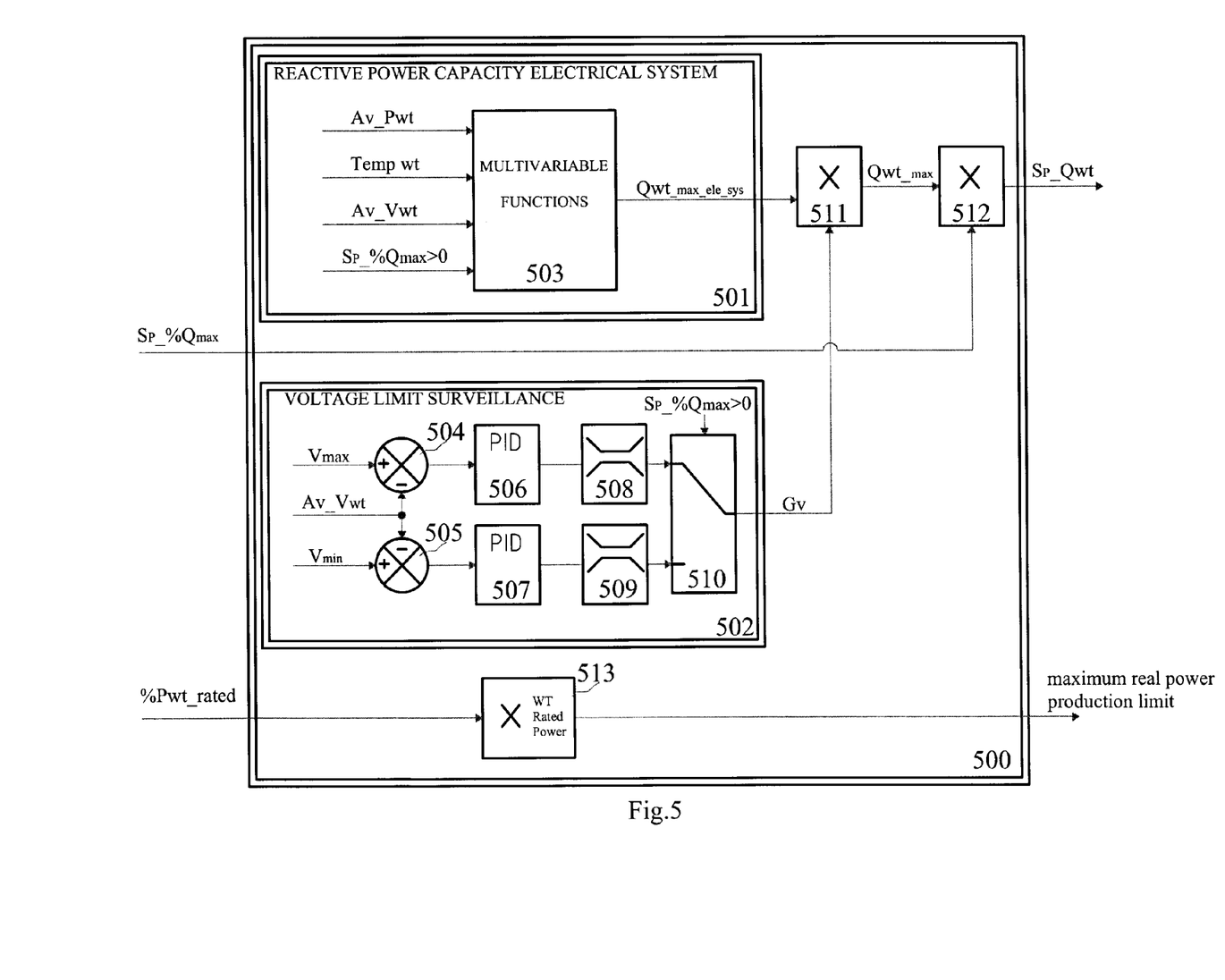
FIG. 5: Illustrates an exemplary embodiment of the Wind Turbine Relative Control (WTRC) for the generation of the reactive power setpoint and the maximum real power production limit for the power control unit.
Figure 6:
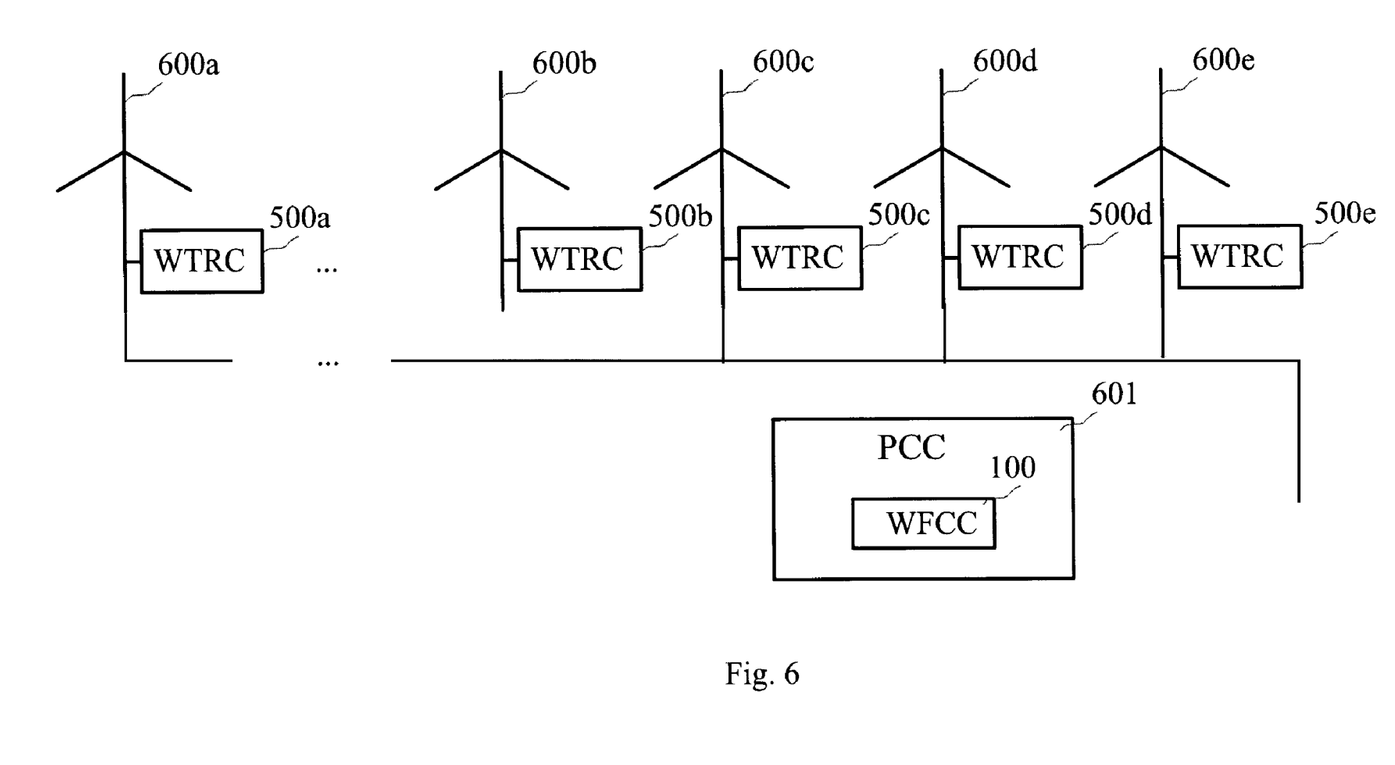
FIG. 6: Illustrates an exemplary embodiment of the topology of the wind farm with the reactive power control system.

An exemplary topology of the wind farm with the reactive power control system is shown in FIG. 6. This system is comprised of a plurality of wind turbines (600a through 600e) and two subsystems: the wind farm central control (WFCC) (100), shown in FIGS. 1-4, which might be located in the substation or point of common coupling (PCC) (601), and the wind turbine relative control (WTRC) (500), shown in FIG. 5, which is carried out in at least one of the wind-turbines in the wind farm (see 500a through 500e in FIG. 6). The objective of this system is to follow a given setpoint of reactive power for the wind-farm as a whole while at the same time keeping account of the possible reactive power reserve that can be delivered in the short term. Moreover, this reserve of maximum reactive power can be managed by the WFCC (100).

Wind Farm Central Control (WFCC) System

The wind farm reactive power setpoint (Sp_Q) and the wind farm reactive power reserve setpoint (Sp_Qres) can be received either from the utility (Sp_$Q_{UTILITY}$ and Sp_$Q_{resUTILITY}$) or generated by the Wind Farm Central Control (Sp_$Q_{WFCC}$ and Sp_$Q_{resWFCC}$) according to several criteria predefined in an optimization algorithm (101). For instance, the power setpoint (Sp_$Q_{WFCC}$) and reactive power reserve setpoint (Sp_$Q_{resWFCC}$) can be generated by the optimization algorithm (101) based on, for example, production optimization, power reserve, grid voltage stability and economic profit optimization.

Figure 1:
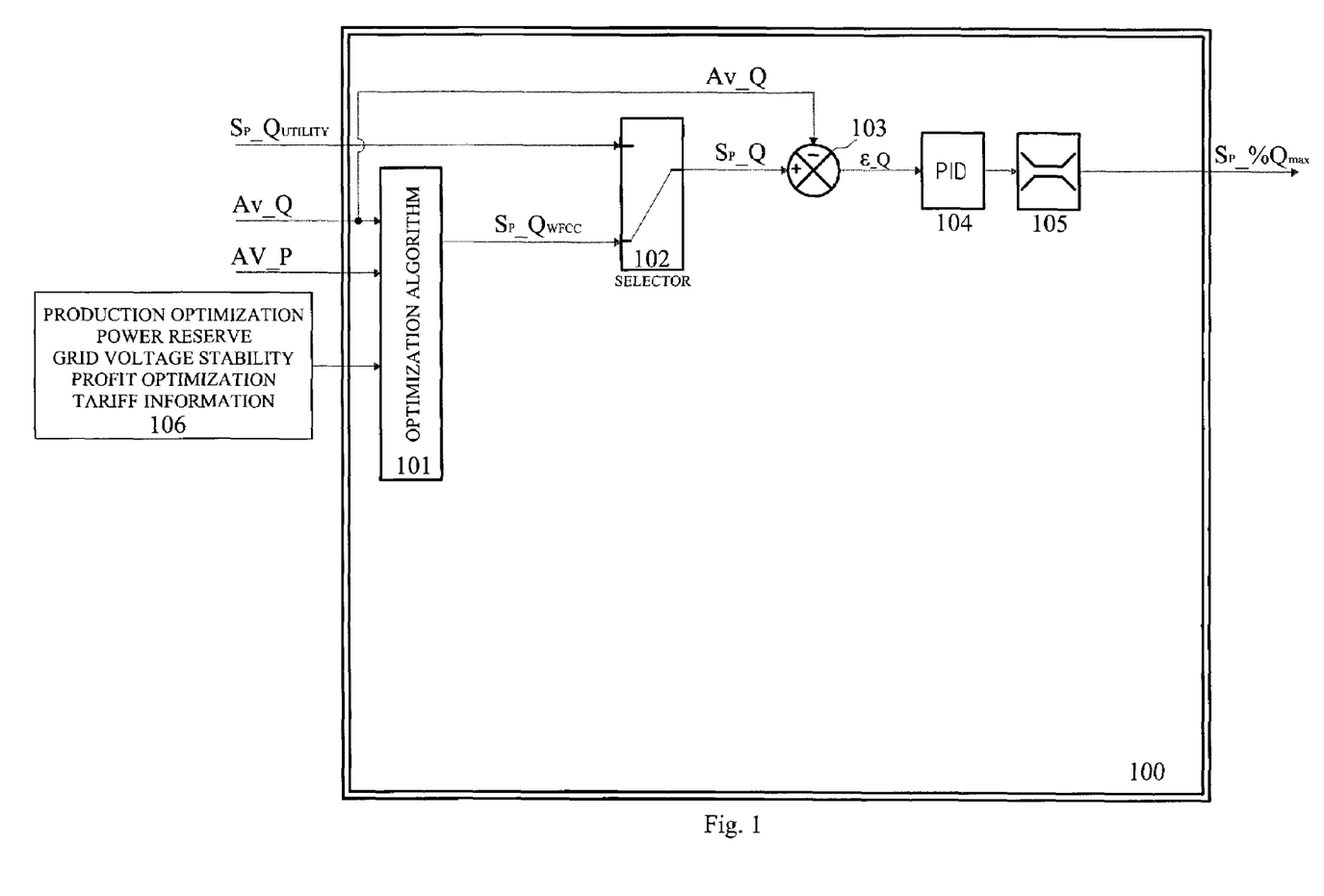
FIG. 1: Illustrates an exemplary embodiment of the Wind Farm Central Control (WFCC) for the management of the reactive power.
Figure 2:
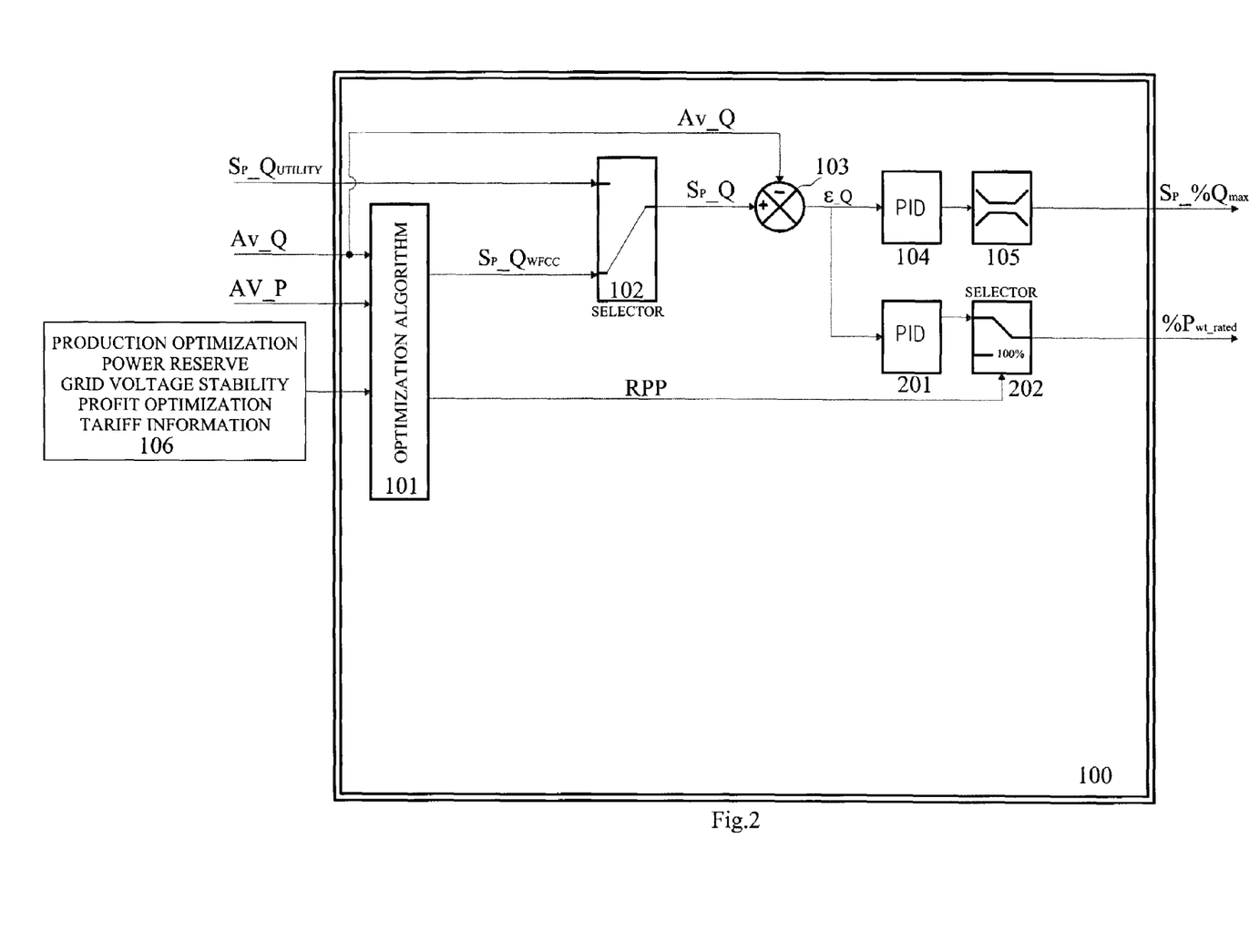
FIG. 2: Illustrates an exemplary embodiment of the WFCC for the management of the reactive power with reactive power priority (RPP).

In one embodiment, illustrated in FIG. 1, for example, the WFCC (100) receives various information (106) used to optimize the reactive power setpoint. Such information (106) includes relevant tariff information from the utility, e.g. kWh-kVARh tariff depending on the time, short term demand, bonus because of reactive power reserve, grid capacity, production optimization information, grid voltage stability information, profit optimization information, etc. In addition, the WFCC (100) receives measurements of the actual real (AV_P) and reactive (AV_Q) power. The WFCC (100) includes an optimization algorithm (101) which is based on economic profit optimization. This algorithm takes into account the aforementioned inputs to generate the reactive power setpoint (Sp_$Q_{WFCC}$) and the reactive power reserve setpoint (Sp_$Q_{resWFCC}$, shown in FIG. 3) in order to maximize the economic profit of the wind farm.

In one embodiment, these criteria could require prioritizing either the reactive power production or the management of a reactive power reserve over the real power production in order to contribute to the electrical grid stability or maximize the economic profit of the wind farm.

Reactive Power Regulation

Referring to FIG. 1, the reactive power setpoint Sp_Q managed by the WFCC (100) is regulated by a PID controller (104) or a more complex structure, by using a value Av_Q which represents the instantaneous reactive power measurement of the wind farm. A selector 102 selects one of two values, $S_{P\_}Q_{WFCC}$ and $S_{P\_}Q_{UTILITY}$, that are input to the selector and outputs that selected value as the reactive power setpoint Sp_Q. In one embodiment the selector (102) outputs $S_{P\_}Q_{WFCC}$ unless a $S_{P\_}Q_{UTILITY}$ is received. A subtractor (103) subtracts the instantaneous reactive power value (Av_Q) from the reactive power setpoint value (Sp_Q) to produce an error value (e_Q). The output of the WFCC controller will be a percentage (Sp_% $Q_{max}$) to be applied to the maximum instantaneous reactive power that each wind turbine can produce ($Q_{wt\_max}$). This relative reactive power command (Sp_% $Q_{max}$) is fed to a limiter (105) which establishes the maximum and minimum allowed percentage. These limits may be either fixed or dynamically adjusted in order to enhance the lifetime of the wind turbine components. Furthermore, these limits can be used in the anti wind-up logic of the controller.

The aforementioned value $Q_{wt\_max}$, which is shown in FIG. 5, will be calculated continuously by each wind turbine according to the local conditions, e.g., ambient temperature, grid conditions, etc. Finally, all the wind turbines will receive a unique command. Thus, the wind farm communication network requirements are not very strict.

In some cases, the total commanded reactive power Sp_Q can not be met by the WFCC (100). In one embodiment, this situation may occur if the value of Sp_Q is higher than the value of Av_Q during a specified time and the set point Sp_% $Q_{max}$ has reached the thresholds (maximum or minimum values) imposed by the aforementioned limiter block (105). Then, in an optional embodiment, shown in FIG. 2, it is possible to prioritize the reactive power production over the real power generation. Hereinafter, this option will be referred as Reactive Power Priority (RPP). In this case, in which real power production can be decreased to allow a higher production of reactive power, the difference between Sp_Q and Av_Q, namely, the error value (e_Q) which is generated by subtractor 103, is input to a PID controller (201) or a more complex structure, which may include a non-linear gain. A selector (202) selects either the output of PID controller (201) or a value representing 100% in response to the RPP value output from the optimization algorithm (101). In the case where RPP is enabled, the selector (202) selects the output of PID controller (201). The value the selector 202 selects is output as a unique command (% $P_{wt\ rated}$) that is distributed to all the wind turbines. Each wind turbine will reduce its maximum power output in accordance to its rated power and the commanded percentage (% $P_{wt\ rated}$). Otherwise, if RPP is not enabled, % $P_{wt\ rated}$ will be 100%.

Reactive Power Reserve Regulation

Figure 3:
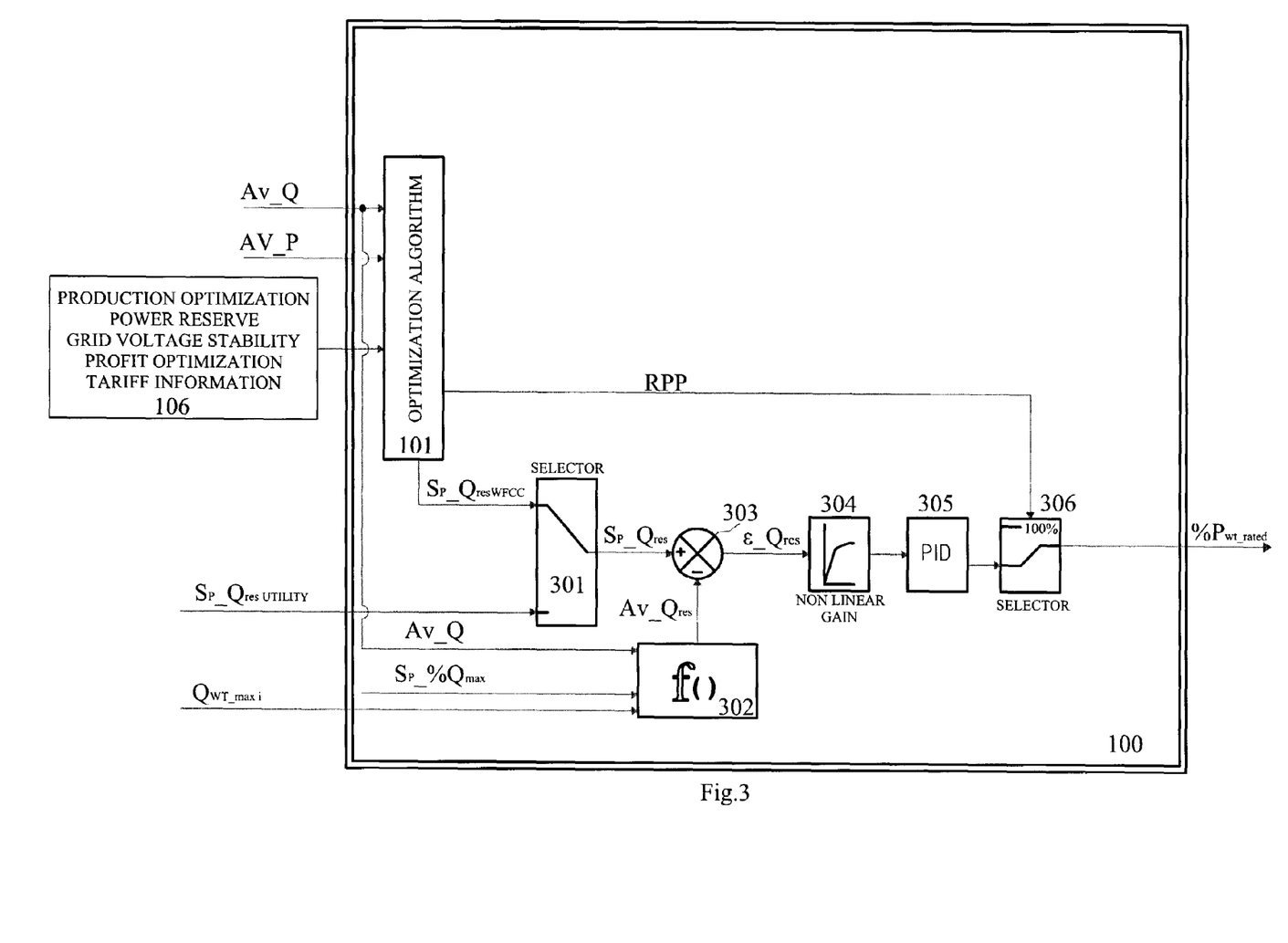
FIG. 3: Illustrates an exemplary embodiment of the WFCC for the management of the reactive power reserve.

Referring to FIG. 3, a reactive power reserve regulation can be selected. In this case, the reactive reserve priority (RRP) mode is selected. In one embodiment, the reactive power reserve setpoint ($Sp\_Q_{res}$) is output by a selector 301 which selects as the output either $Sp\_Q_{resWFCC}$ or $Sp\_Q_{resUTILITY}$. In one embodiment the selector (301) outputs $Sp\_Q_{resWFCC}$ unless a $Sp\_Q_{resUTILITY}$ is received. The reactive power reserve setpoint ($Sp\_Q_{res}$) is regulated by a PID controller (305) or a more complex structure, by using an estimation of the instantaneous reactive power reserve of the wind farm ($Av\_Q_{res}$). The value of $Av\_Q_{res}$ is worked out by means of a function block (302) according to the following formula:

$$Av\_Q_{res} \approx Av\_Q \cdot \left( \frac{100 - Sp\_\%Q_{max}}{Sp\_\%Q_{max}} \right) \quad \text{Eq. 1}$$

In the case where the reactive power regulation is not being carried out by the WFCC or the value of Sp_Q is negligible, the value of $Av\_Q_{res}$ can be calculated as:

$$\sum_i Qwt\_max_i \frac{(100 - Sp\_\%Qmax)}{100} \quad \text{Eq. 2}$$

Wherein $Qwt\_max_i$ is the maximum instantaneous reactive power that each wind turbine can produce, where i indicates a particular one of the wind turbines in the wind farm. In this particular case, each wind turbine must continuously communicate to the WFCC its reactive power capacity.

Subtractor 303 outputs the difference between Sp_Qres and Av_Qres, shown as error value $\_\epsilon\_Q_{res}$, which is input to a PID controller (305) or a more complex structure, which may include a non-linear gain unit (304).

The optimization algorithm 101 outputs an active RRP value if the reactive reserve priority (RRP) is enabled. A selector (306), in response to an active RRP value, selects the output of such controller to output a % $P_{wt\ rated}$ value that is distributed as a unique command to all the wind turbines. Otherwise, if RRP is not enabled, the selector selects the value of 100% for the value of % $P_{wt\ rated}$. Each wind turbine will reduce its maximum power output in accordance to its rated power and the commanded percentage (% $P_{wt\ rated}$). This is an operational mode wherein the reactive power reserve is prioritized over the real power production.

Operational Modes Selection

The reactive power regulation and reactive power reserve regulation operational modes can be enabled or disabled by the WFCC. These modes are not exclusive, but can be combined in an arbitrary way.

Figure 4:
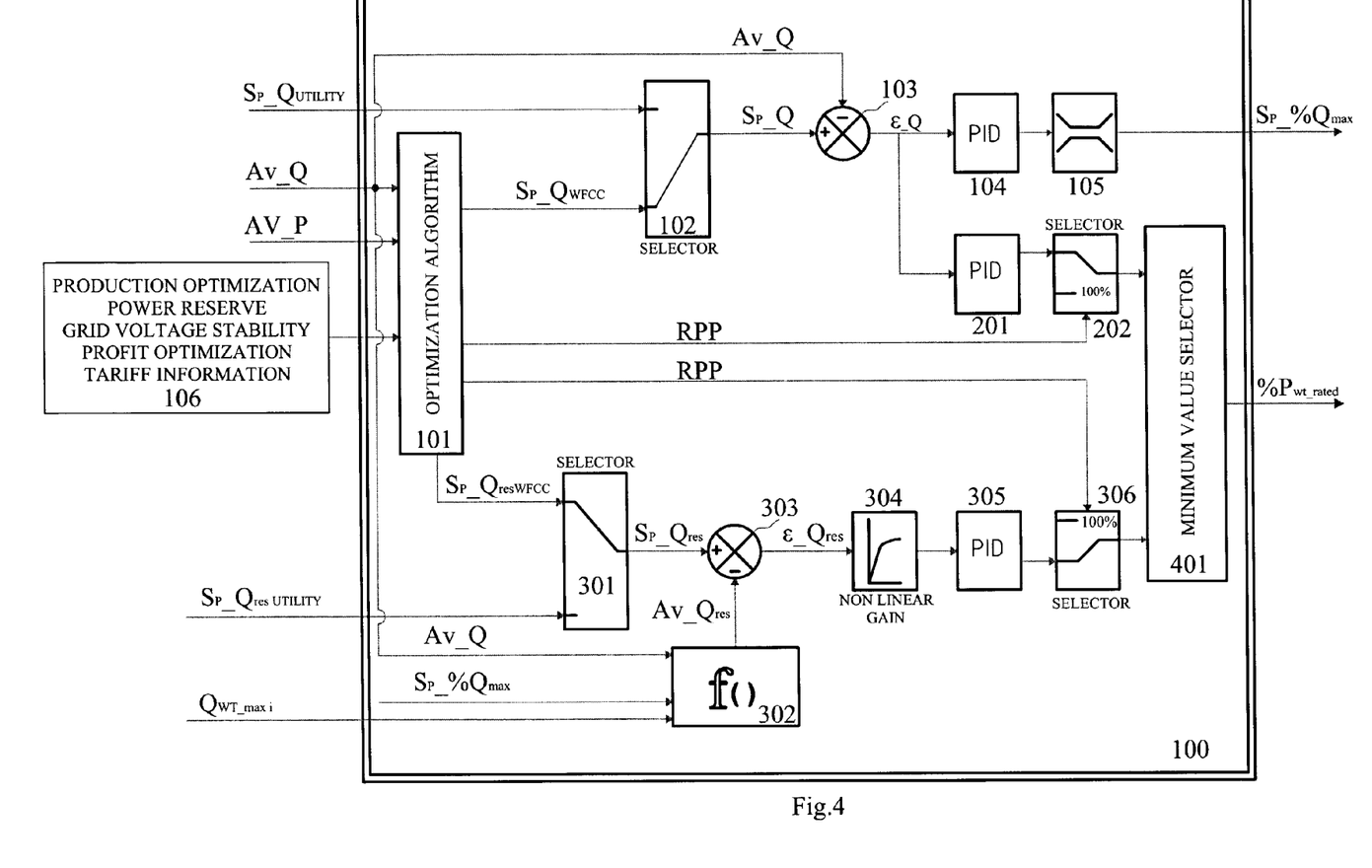
FIG. 4: Illustrates an exemplary embodiment of the WFCC for the management of the reactive power and the reactive power reserve.

For example, FIG. 4 shows the case where both operational modes are activated and the Reactive Power Priority (RPP) is enabled. Here, a minimum value selector (401) will determine whether the output of the selector 202 or the output of selector 306 is commanded as % $P_{wt\ rated}$ to the wind turbines based on whichever one is smaller.

Wind Turbine Relative Control (WTRC) System

Referring to FIG. 5, a wind turbine relative control (WTRC) (500) system includes a reactive power capacity electrical system (501) and a voltage limit surveillance unit 502. The WTRC (500) system receives relative power commands (Sp_% Qmax and % $P_{wt\ rated}$) from the WFCC. These commands, which are expressed in relative terms as percentages instead of using physical absolute units, are fed to the wind turbine power regulation system.

Wind Turbine Reactive Power Control

The wind turbine relative control (WTRC) is continuously calculating its reactive power capacity (Qwt_max) and generates the reactive power setpoint to the power control unit by multiplying (512) it by the relative reactive power command (Sp_% Qmax). In such a way, the final conversion of the reactive power setpoint to physical units is carried out in the individual wind turbines. Thereby, the WFCC is decoupled from the wind turbines' technology allowing the use of wind turbines from different manufacturers.

Qwt_max is the maximum reactive power that the wind turbine can deliver while keeping safety conditions within specified operational limits. Therefore, it includes both the electrical system and the grid conditions.

In one embodiment, the calculation of the reactive power capacity of the electrical system (501), Qwt_max_ele_sys, is carried out by using multivariable functions (503). Said functions may have as inputs real power, temperatures (Temp wt) and voltages (Av_Pwt, Av_Vwt).

In a preferred embodiment, the multivariable functions (503) are calculated for the main components (generator, power converter, electrical cabinet, etc) of the electrical system. These functions are not independent of the sign of Sp_Qmax. That is, there might be different maximum and minimum limits depending on if the reactive power is consumed or produced by the generator.

Grid conditions are taken into account by a voltage limit surveillance algorithm unit (502). In a preferred embodiment, measured grid voltage (Av_Vwt) is compared, using comparators (504) and (505), with the voltage operational limits of the wind turbine. Measured grid voltage is both compared (504) with the upper limit (Vmax−Av_Vwt), and compared (505) with the lower limit (Av_Vwt−Vmin). These differences are input, respectively, to PID controller (506) and PID controller (507) or more complex structures which output can limit the output, such as limiters (508 and 509). The sign of Sp_% Qmax is input to a selector (510). In the case where the sign Sp_% Qmax is positive, the selector (510) selects the output of limiter (508) (supply of reactive power to the grid). In the case where the sign of Sp_% Qmax is negative, the selector (510) selects the output of limiter (509) (consumption of reactive power from the grid). The output of selector (510), Gv, is a percentage factor to be applied in a multiplier block (511) to the aforementioned reactive power capacity of the electrical system (Qwt_max_ele_sys). The output of multiplier block (511) is multiplied by the Sp_% Qmax value in another multiplier block (512) to obtain the reactive power setpoint (Sp_Qwt) to the power control unit.

According to a non-limiting example, a wind farm of two wind turbines (wt_A and wt_B) is considered. The WFCC sends SP_% Qmax=0.75 (75%) to each wind turbine.

wt_A is producing 3MW and according to its local conditions has calculated a reactive power capacity of Qwt_max=1MVAR.

wt_B is producing 2.4MW and according to its local conditions has calculated a reactive power capacity of Qwt_max=2MVAR.

The reactive power setpoint applied to the power control unit of wt_A is Sp_Qwt=Qwt_max·Sp_% Qmax=1MVAR·0.75=750 kVAR.

The reactive power setpoint applied to the power control unit of wt_B is Sp_Qwt=Qwt_max·Sp_% Qmax=2MVAR·0.75=1500 kVAR.

Wind Turbine Reactive Priority Control

The Wind Turbine Relative Control (WTRC) (500) system receives % $P_{wt\,rated}$ from the WFCC (100). Usually, this command is 100% but can be decreased in the case where the reactive power reserve or reactive power production is prioritized over real power generation.

The WTRC calculates the maximum real power production limit by multiplying the % $P_{wt\,rated}$ by the rated power of the wind turbine in multiplier (513) shown in FIG. 5. This limit is input to the power control algorithm of the wind turbine. The wind turbine will follow its normal operation if its real power setpoint (Sp_P) is lower than the calculated maximum real power production limit. Otherwise, the real power setpoint will be limited to the maximum real power production limit in the power control algorithm of the wind turbine.

Numerous modifications may be made to the exemplary embodiments of the invention without departing from the spirit and scope of the embodiments of the present invention as defined in the following claims.

What is claimed is:

1. A method of reactive power regulation in a wind farm having a plurality of wind turbines, comprising:
   obtaining a reactive power setpoint (Sp_Q);
   measuring a reactive power output of the wind farm (Av_Q);
   calculating an error ($\epsilon$_Q) between the reactive power setpoint and the measured reactive power output;
   using the error ($\epsilon$_Q) as input to a PID controller to generate a relative reactive power command (Sp_% Qmax);
   sending the relative reactive power command (Sp_% Qmax) to each of the plurality of wind turbines; and
   applying the relative reactive power command (Sp_% Qmax) as a percentage to an instantaneous maximum reactive power capacity (Qwt_max) in performing power regulation for each of the wind turbines.

2. The method of claim 1 further comprising the steps of:
   prioritizing the reactive power over the real power production (RPP) if the relative reactive power command (Sp_% Qmax) has reached a maximum allowed value;
   using the error ($\epsilon$_Q) to generate a relative real power limit command (% Pwt_rated) if the reactive power production is prioritized over the real power production;
   sending the relative real power limit command (% Pwt_rated) to each of the plurality of wind turbines; and
   applying the relative real power limit command (% Pwt_rated) in each of the plurality of wind turbines as a percentage of a rated real power to obtain a real power production limit.

3. A method according to claim 2, wherein the relative reactive power command (Sp_% Qmax) and the relative real power limit command (% Pwt_rated) are calculated by using an economic profit optimization algorithm.

4. A method according to claim 1, wherein the relative reactive power command (Sp_% Qmax) is calculated by using an economic profit optimization algorithm.

5. A method of reactive power reserve regulation in a wind farm having a plurality of wind turbines, comprising:
   prioritizing a reactive power reserve over the real power production (RRP);
   obtaining a reactive power reserve setpoint (Sp_Qres);
   calculating a reactive power reserve of the wind farm (Av_Qres);
   calculating an error ($\epsilon$_Qres) between the reactive power reserve setpoint and the calculated reactive power reserve of the wind farm;
   using the error ($\epsilon$_Qres) to generate a relative real power limit command (% Pwt_rated);
   sending the relative real power command (% Pwt_rated) to each of the wind turbines; and
   applying the relative real power command (% Pwt_rated) in each wind turbine as a percentage of the rated real power to obtain a real power production limit.

6. A method according to claim 5, wherein relative real power limit command (% Pwt_rated) is calculated by using an economic profit optimization algorithm.

7. A method for generating a reactive power setpoint for a power control unit of a wind turbine, comprising:
   calculating a reactive power capacity of an electrical system of the wind turbine (Qwt_max_ele_sys) and limiting the calculated reactive power capacity by applying a voltage surveillance value (Gv) that takes into account grid conditions to obtain an instantaneous maximum reactive power capacity (Qwt_max);
   receiving a relative reactive power command (Sp_% Qmax); and
   applying the relative reactive power command (Sp_% Qmax) to the obtained instantaneous maximum reactive power capacity (Qwt_max) to generate a reactive power setpoint (Sp_Qwt) for the power control unit.

8. A method of power regulation in a wind farm having a plurality of wind turbines, comprising:
   generating a reactive power command and a real power command by using an economic profit optimization algorithm; and
   sending the generated reactive power command and the real power command to the plurality of wind turbines.

* * * * *